May 25, 1926.
T. HUERTH
QUICK STACKER
Filed Jan. 5, 1925
1,585,715
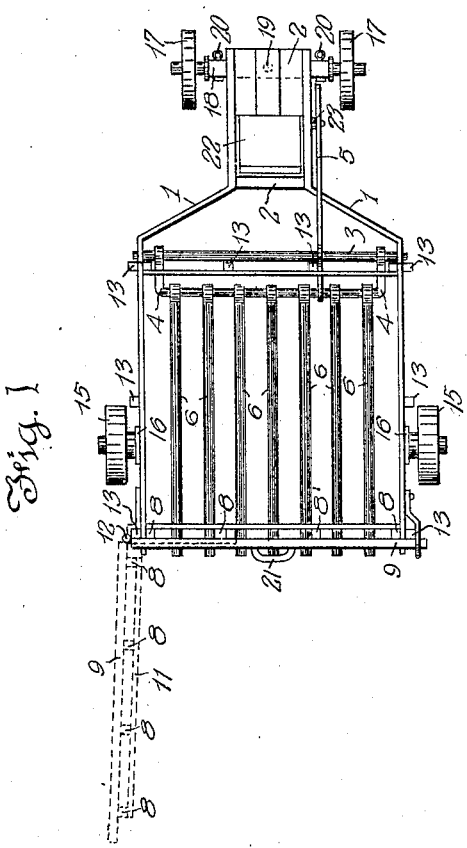
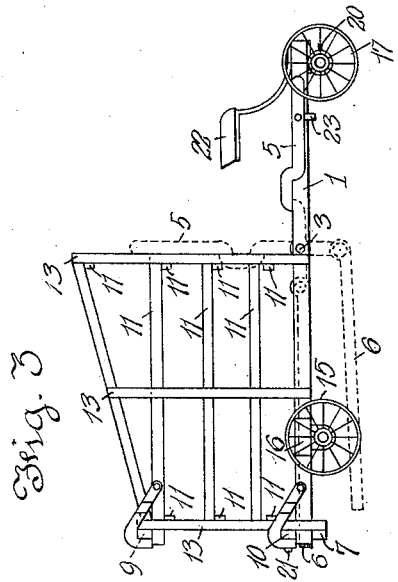
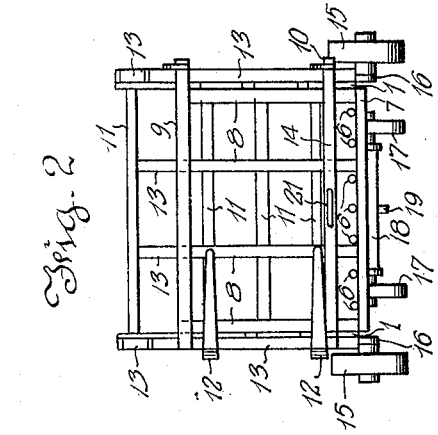
INVENTOR.
THEODORE. HUERTH.
BY Charles. Albert. French.
ATTORNEY.

Patented May 25, 1926.

1,585,715

UNITED STATES PATENT OFFICE.

THEODORE HUERTH, OF SAUK CITY, WISCONSIN.

QUICK STACKER.

Application filed January 5, 1925. Serial No. 710.

My invention relates to a rack or crib mounted on wheels for forming loose material such as hay, field peas, or any similar substance into a compact stack, which when complete may be hauled to the desired locality and deposited by lowering the bottom, and opening the rear end gate; and the objects of my invention are, first, to construct a convenient and substantial rack of suitable material, and mount it on wheels so that it can be drawn by animal or motor power; second, to have the front end and sides secured together at their corners; third, to have the rear end gate hinged to one side of the rack and supported transversely by transverse bars resting on members of the sides extending backward from the rear end posts; and fourth, to have a drop bottom comprising beams hingedly connected at their front ends to a transversely disposed crank shaft and their rear ends resting on a transverse beam at the bottom of the end gate.

I attain these objects by the mechanism shown in the accompanying drawing in which—

Fig. 1, is a plan;
Fig. 2, is a rear elevation;
Fig. 3, is a side elevation.

Similar numerals refer to similar parts throughout the several views.

The frame side rails 1 are of metal of any desired cross section, and extend the entire length of the machine. Transverse tie beams 2 are located at the front end, and a distance back from the same. A shaft 3 is journaled in the sides of the frame and extends from one side to the other. A double crank arm 4 is secured to the shaft inside of and adjacent the side rails, and a lever 5 is attached to the shaft and crank arm at its lower or inner end. A plurality of rods 6 hingedly mounted on the crank arm at their front ends and extending backward provide a bottom when the rear ends of the rods are resting upon a cross beam 7 hereinafter described. A rear end gate comprising vertical posts 8, upper rail 9, cross beam 7, intermediate supporting rail 10 and slats 11 is connected by hinges 12 to one side of the rack, which is composed of vertical posts 13 along both sides and across the front, said posts are spaced apart and secured at their lower ends to the side rails and a cross beam 14 and are provided with spaced slats 11 the same as the end gate; for some kinds of material the rack may be sheathed on the inside. A hook 23 is attached to the lever 5 and is adapted to hook under the side rail 1 for holding the bottom up while loading the rack. Wheels 15 are revolubly mounted on axles secured to the side rails by depending brackets 16, and wheels 17 are disposed on an axle 18 connected to the front end of the frame by a king bolt 19. Eye-bolts 20 provide a means for hitching to the front end of the stacker and a loop 21 is secured to the cross beam 10 for connecting a hay-loader to the rear end of the stacker. A seat 22 may be located adjacent the front of the frame in any desired manner. To use my stacker, hitch any motive power to the front axle, and a hay loader to the rear end adapted to deliver hay into the rack, and when the rack is filled and sufficiently trampled, draw the load to the desired place, remove the loader, open the end gate, and raise the front end of the lever 5, which will lower the rods under the load by pulling them off of the beam 7 and allowing them to fall to the ground; then draw the stacker forward and the stack is built by only handling the hay once. It is obvious that a rick of any length may be built in this manner.

Having thus described my invention, I claim:

1. In a quick stacker for hay, a rack mounted on wheels with a rear end gate hinged to one corner of the same and secured by hooks to the other corner, a beam across the gate adjacent the bottom thereof for supporting the rear ends of joists, a shaft journaled in boxes and disposed across the rack under the front end thereof, a crank arm secured to and extending approximately the length of the shaft, a series of joists pivotally attached at their front ends to the crank arm with the rear normally resting upon the cross-beam at the bottom of the gate, a lever mounted on the shaft and crank-arm in such a manner that raising the front end of the lever will pull forward the joist off of the beam and force them to the ground, and lowering the front end of the lever will raise the joist by means of the crank-arm, and means for locking the lever in the lower position.

2. A unitary stacker, comprising a base frame, front and side fences, a lateral swinging gate associated with the side fences and having means for being secured thereto, a drop bottom normally supported at one end by said gate, and a lever operatively associated with said bottom for raising and lowering the same.

3. In a quick stacker for hay, a rack mounted on wheels with a rear end gate hinged to one corner of the same and releasably secured to the other corner, a shaft disposed across the rack, a crank arm secured to said shaft, a plurality of spaced joists pivotally attached at their front ends to the crank arm, the rear portions of said joists being normally supported by a portion of said gate, and a lever associated with said shaft and crank arm for manually disengaging the joist from the gate and lowering the same.

In testimony whereof I affix my signature.

THEODORE HUERTH.